(12) United States Patent
Hunt

(10) Patent No.: US 6,868,079 B1
(45) Date of Patent: Mar. 15, 2005

(54) RADIO COMMUNICATION SYSTEM WITH REQUEST RE-TRANSMISSION UNTIL ACKNOWLEDGED

(75) Inventor: Bernard Hunt, Redhill (GB)

(73) Assignee: Koninklijke Philips Electronic N.V., Eindhoven (NL)

( * ) Notice: Subject to any disclaimer, the term of this patent is extended or adjusted under 35 U.S.C. 154(b) by 0 days.

(21) Appl. No.: 09/455,124

(22) Filed: Dec. 6, 1999

(30) Foreign Application Priority Data

Dec. 10, 1998 (GB) ............................................. 9827182

(51) Int. Cl.$^7$ .................................................. H04J 3/00
(52) U.S. Cl. ...................... 370/345; 370/328; 370/336; 370/343; 370/347; 455/434; 455/435.3; 455/451
(58) Field of Search ................................ 370/328, 329, 370/336, 337, 345, 343, 230, 347, 346; 455/434, 451, 435.3, 471, 435; 714/748

(56) References Cited

U.S. PATENT DOCUMENTS

| | | | |
|---|---|---|---|
| 4,414,661 A | | 11/1983 | Karlstrom ..................... 370/95 |
| 4,888,767 A | * | 12/1989 | Furuya et al. .............. 370/243 |
| 5,594,738 A | * | 1/1997 | Crisler et al. ................ 370/347 |
| 5,790,535 A | * | 8/1998 | Kou ............................ 370/337 |
| 5,854,785 A | * | 12/1998 | Willey ......................... 370/332 |
| 5,926,469 A | * | 7/1999 | Norstedt et al. ............. 370/329 |
| 6,097,717 A | * | 8/2000 | Turina et al. ................ 370/348 |
| 6,256,301 B1 | * | 7/2001 | Tiedemann et al. ......... 370/342 |
| 6,301,249 B1 | * | 10/2001 | Mansfield et al. .......... 370/394 |
| 6,320,869 B1 | * | 11/2001 | Van Driel et al. .......... 370/443 |
| 6,463,298 B1 | * | 10/2002 | Sorenson et al. ........ 455/552.1 |
| 6,542,488 B2 | * | 4/2003 | Walton et al. ............... 370/335 |

OTHER PUBLICATIONS

Schwartz, Mischa; "Tellicommunication Networks", Nov. 1988, pp. 122–124.*

* cited by examiner

*Primary Examiner*—Nick Corsaro
*Assistant Examiner*—Alan T. Gantt
(74) *Attorney, Agent, or Firm*—Dicran Halajian

(57) ABSTRACT

A method of operating a radio communication system in which secondary stations use dedicated time slots to request services from a primary station. A secondary station wishing to request a service sends a request in every time slot allocated to it until it receives an acknowledgement from the primary station. The primary station can use combining techniques on multiple time slots to identify the presence or absence of a request from a secondary station with improved accuracy.

18 Claims, 3 Drawing Sheets

RADIO COMMUNICATION SYSTEM WITH REQUEST RE-TRANSMISSION UNTIL ACKNOWLEDGED

FIELD OF THE INVENTION

The present invention relates to a method of operating a radio communication system, and further relates to such a system and to primary and secondary stations for use in such a system. While the present specification describes a system with particular reference to the emerging Universal Mobile Telecommunication System (UMTS), it is to be understood that such techniques are equally applicable to use in other mobile radio systems.

BACKGROUND OF THE INVENTION

In a radio communication system it is generally required to be able to exchange signalling messages between a Mobile Station (MS) and a Base Station (BS). Downlink signalling (from BS to MS) is usually realised by using a physical broadcast channel of the BS to address any MS in its coverage area. Since only one transmitter (the BS) uses this broadcast channel there is no access problem.

In contrast, uplink signalling (from MS to BS) requires more detailed considerations. If the MS already has an uplink channel assigned to it, for voice or data services, this signalling can be achieved by piggy-backing, in which the signalling messages are attached to data packets being sent from the MS to the BS. However, if there is no uplink channel assigned to the MS piggy-backing is not possible. In this case a fast uplink signalling mechanism should be available for the establishment, or re-establishment, of a new uplink channel.

In conventional systems, for example those operating to the Global System for Mobile communication (GSM) standard, fast uplink signalling is enabled by the provision of a random access channel using a slotted ALOHA or similar protocol. However, such a scheme works satisfactorily only with a low traffic load, and is not believed to be capable of handling the requirements imposed by third-generation telecommunications standards such as UMTS.

To meet these requirements one UMTS embodiment includes a dedicated signalling channel, which comprises frames including a time slot for each MS registered with the controlling BS. If a MS requires a service from the BS it transmits a request in its allocated slot then waits for an acknowledgement from the BS setting up the required service. Parameters which characterise the performance of the signalling channel include the false alarm rate (where the BS erroneously identifies a MS as requesting a service), the missed detection rate (where the BS does not detect a request from a MS), and the delay between a request for a service by the MS and the provision of that service by the BS.

SUMMARY OF THE INVENTION

An object of the present invention is to improve the efficiency of the method by which a MS requests resources from a BS.

According to a first aspect of the present invention there is provided a method of operating a radio communication system, comprising a secondary station transmitting a request for resources to a primary station in a time slot allocated to the secondary station, characterised by the secondary station re-transmitting the request in at least a majority of its allocated time slots until an acknowledgement is received from the primary station.

This scheme improves the typical time for a response by the primary station to a request by a secondary station. Because there is no possibility of requests from different secondary stations colliding, a secondary station can retransmit requests in each allocated time slot. In contrast, in prior art systems a secondary station has to wait at least long enough for the primary station to have received, processed and acknowledged a request before it is able to retransmit.

Further, the primary station can improve the accuracy with which it determines whether a request was sent by a particular secondary station if the received signal strength is close to the detection threshold by examining the received signals in multiple time slots allocated to the secondary station in question.

According to a second aspect of the present invention there is provided a radio communication system comprising a primary station and a plurality of secondary stations, the primary station having means for allocating a time slot for a secondary station to transmit a request for resources to the primary station, characterised in that the secondary station has means for re-transmitting the request in at least a majority of its allocated time slots until it receives an acknowledgement from the primary station.

According to a third aspect of the present invention there is provided a primary station for use in a radio communication system, the primary station having means for allocating time slots to secondary stations for requesting resources, characterised in that the primary station has combining means for determining from a combination of received signals in a plurality of successive time slots allocated to the secondary station whether the secondary station has transmitted a request for resources.

According to a fourth aspect of the present invention there is provided a secondary station for use in a radio communication system including a primary station having means for allocating a time slot for the secondary station to transmit a request for resources to the primary station, characterised in that means are provided for re-transmitting the request in at least a majority of the allocated time slots until an acknowledgement is received from the primary station.

The present invention is based upon the recognition, not present in the prior art, that in a system having time slots allocated to a secondary station for requesting resources, improved performance can be obtained by the secondary station repeating the request until an acknowledgement is received.

BRIEF DESCRIPTION OF THE DRAWINGS

Embodiments of the present invention will now be described, by way of example, with reference to the accompanying drawings, wherein.

In the drawings the same reference numerals have been used to indicate corresponding features.

DETAILED DESCRIPTION OF THE INVENTION

Figure 1:
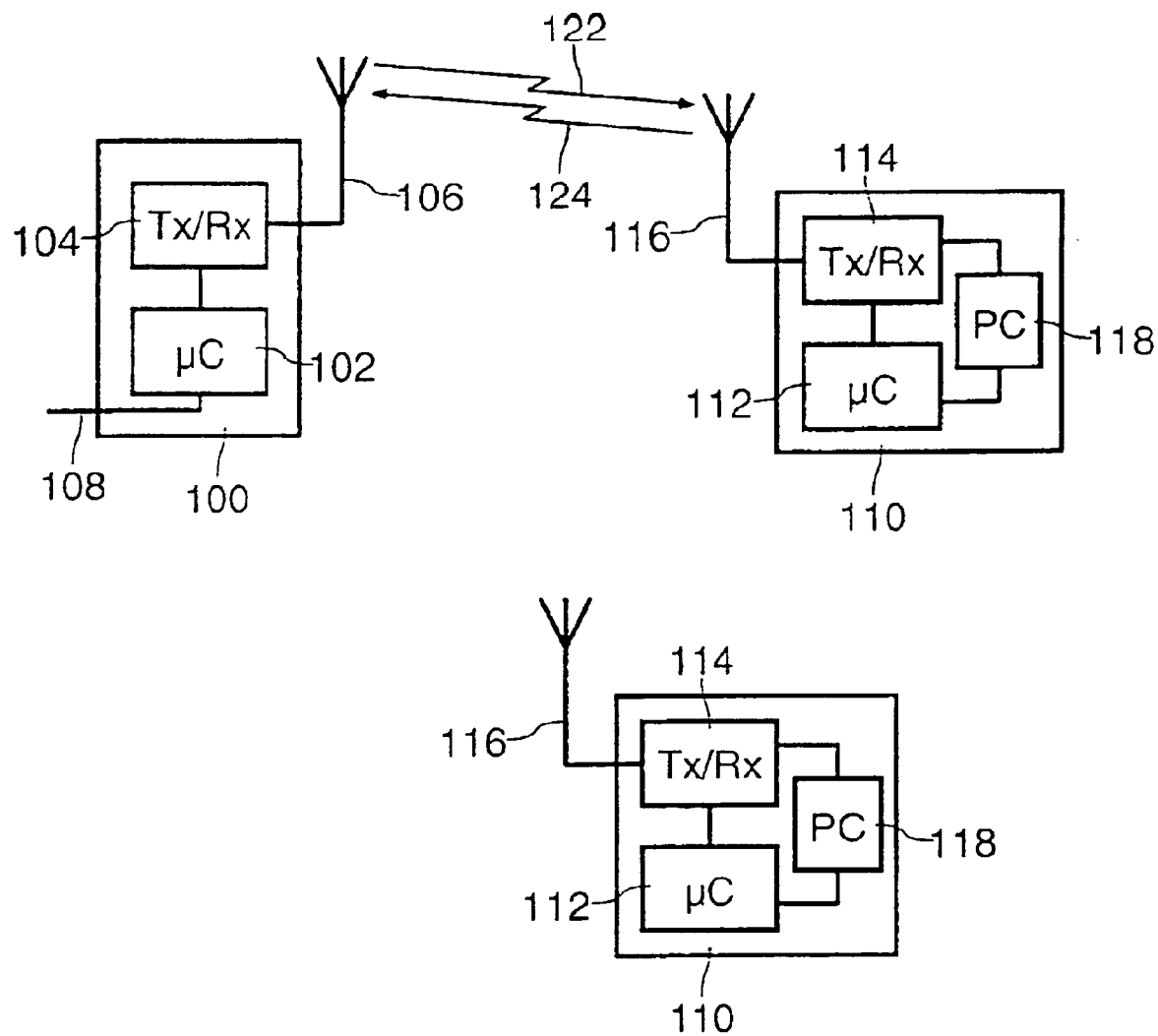
FIG. 1 is a block schematic diagram of a radio communication system.

Referring to FIG. 1, a radio communication system comprises a fill primary station (BS) 100 and a plurality of secondary stations (MS) 110. The BS 100 comprises a microcontroller ($\mu$C) 102, transceiver means 104 connected to radio transmission means 106, and connection means 108 for connection to the PSTN or other suitable network. Each MS 110 comprises a microcontroller ($\mu$C) 112, transceiver means 114 connected to radio transmission means 116, and power control means 118 for altering the transmitted power level. Communication from BS 100 to MS 110 takes place on a downlink channel 122, while communication from MS 110 to BS 100 takes place on an uplink channel 124.

Figure 2:
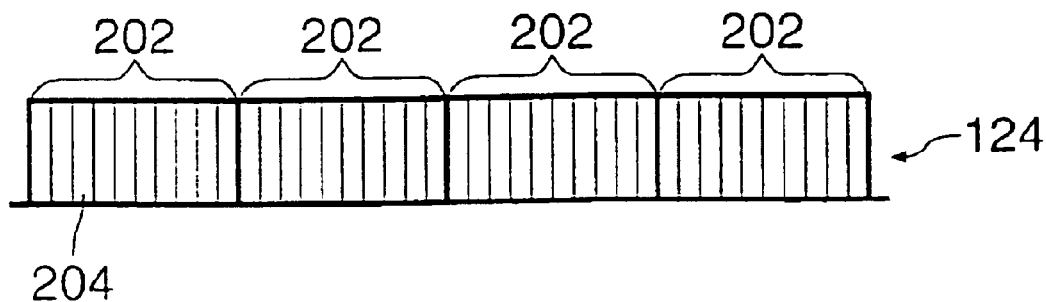
FIG. 2 illustrates a possible frame format for a dedicated uplink signalling channel.

The present invention is concerned with an uplink channel 124 dedicated to the transmission of requests for services by a MS 110 to a BS 100. One arrangement of such a channel for UMTS is illustrated in FIG. 2. The uplink channel 124 is divided into a succession of frames 202, each of length 10 ms, and each MS 110 registered with the BS 100 is allocated a time slot 204 in each frame in which it can transmit a request for service. Although only ten time slots 204 are shown in each frame 202, in practice there may be many more per frame.

Although it is anticipated that a single dedicated uplink channel 124 will provide sufficient capacity in normal situations, it is possible for there to be more mobile stations 110 registered with a BS 100 than there are available time slots in each frame. In such circumstances the BS 100 can either make another uplink channel 124 available for fast signalling purposes or increase the capacity of the existing channel by not allocating a time slot for every MS 110 in every frame.

In traditional signalling schemes, for example that used for the random access channel in GSM, a MS 110 makes a request for service to a BS 100 and then waits for an acknowledgement from the BS 100. If no acknowledgement is received after a predetermined period of time, the MS 110 assumes that the request was not correctly received and schedules another request. This scheme minimises traffic on the channel to minimise collisions between requests from different mobile stations 110 thereby avoiding loss of channel capacity.

Figure 3:
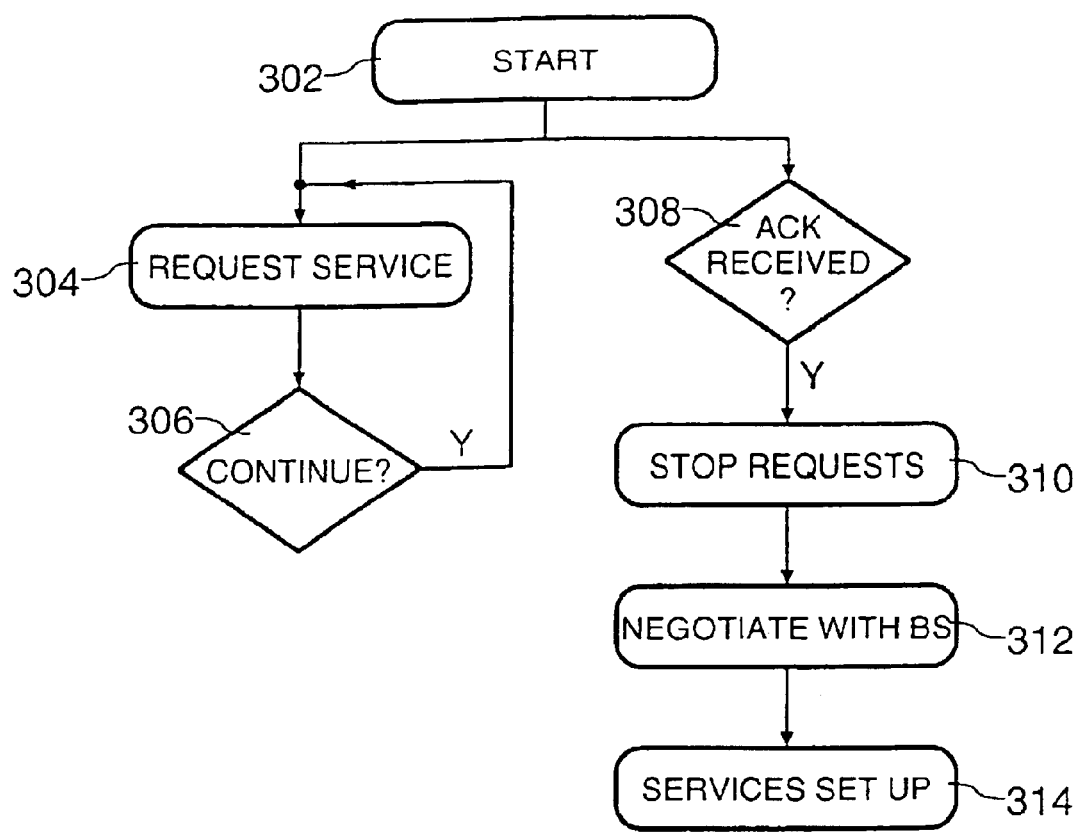
FIG. 3 is a flow chart illustrating a method in accordance with the present invention of a mobile station requesting a service from a base station.

However, in a dedicated uplink channel 124 having time slots allocated to each MS 110 collisions will not normally occur. A more effective signalling scheme, in accordance with the present invention, is that shown in FIG. 3. The process starts at 302 when the MS 110 determines that it requires a service from the BS 100. The MS 110 then makes a request for service 304 in the next time slot 204 (FIG. 2) allocated to it. In a Code Division Multiple Access (CDMA) system, the request 304 is made by transmitting a predetermined code sequence. Requests 304 continue to be made in successive allocated time slots 204 until a first test 306 determines that no further requests should be made, for example by examining the value of a flag that was set to true at the start 302 of the process.

A second test 308 determines whether the MS 110 has received an acknowledgement from the BS 100. When the second test 308 determines that an acknowledgement has been received from the BS 100, the MS 110 at 310 stops any further requests from being sent, for example by setting to false a flag that is checked by the first test 306. The MS 110 then begins negotiations 312 with the BS 100 to define fully the required services. Finally, at 314, the required services are set up by the BS 100.

This scheme has the advantage that if a request is not received correctly by the BS 100 it can be repeated at the frame rate (100 Hz for the 10 ms frame defined in UMTS), or at least in every allocated time slot if the system is busy and a time slot is not allocated in every frame. In a traditional scheme it is not guaranteed that a request could be received and processed by the BS 100 sufficiently rapidly for an acknowledgement to be scheduled for the immediately following frame, so the time that a MS 110 has to wait before re-transmitting the request is substantially longer.

A further advantage of the signalling scheme in accordance with the present invention is that the quality of detection at the BS 100 can be improved by combining requests. Since the BS 100 knows that requests will be repeated in every frame, it can postpone making a decision about a possible received request when this request is near to the decision threshold and use information from the next (and subsequent) frames to improve the confidence of the decision. This amounts to a form of time diversity, and will improve the robustness of the signalling scheme to the effects of fading, near-far effect and other interference.

In one embodiment of UMTS, the dedicated uplink channel employs a CDMA technique. Using information transmitted on a downlink broadcast channel 122 by the BS 100, each MS 110 is able to determine the uplink signalling sequence it should use (thereby defining the dedicated uplink channel 124) and the time slot 204 it is allocated in a frame 202. The uplink signalling sequence is detected at the BS 100 by a matched filter, and the time at which a peak appears in the output of the matched filter indicates which MS 110 issued the request.

Figure 4:
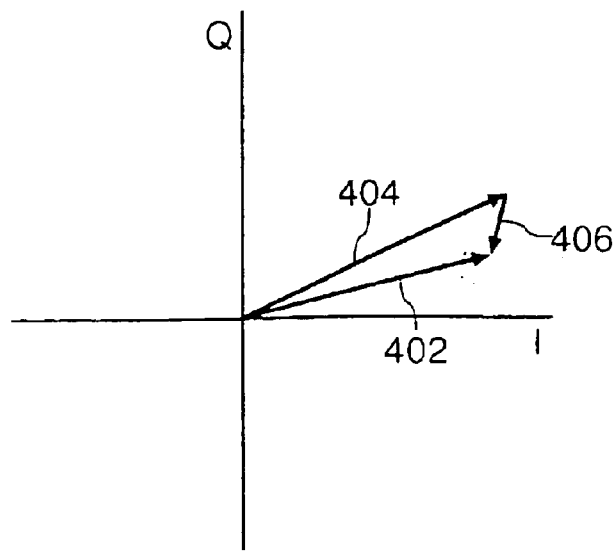
FIG. 4 is a complex phasor plot showing the output of a matched filter in a BS in the presence of noise.

Simulations have been performed to investigate the advantages of combining successive transmitted requests at the BS 100. FIG. 4 is a complex phasor plot illustrating a model for the effect of noise on the output of the matched filter in the BS 100. Noise was modelled as complex Gaussian noise, with the result that the output 402 of the matched filter is the vector sum of a signal peak 404 and a complex Gaussian noise vector 406. In the absence of a signal 402, the filter output is simply complex Gaussian noise.

In a first simulation the level of the signal 404 was held fixed and varying levels of noise 406 applied. In a scheme with no combining the magnitude of the filter output vector 402 is compared to a threshold value, and if it exceeds this value a signal is assumed to be present. Two different error rates were measured: the False Alarm Rate (FAR), which is the probability of detecting a signal when only noise is present; and the Missed Detection Rate (MDR), which is the probability of failing to detect a signal which is present.

A simple combining scheme was also simulated, in which the magnitudes of two successive matched filter outputs were added together and compared to a (different) threshold to determine whether a signal was present. For both schemes the threshold was set as a multiple of the rms noise magnitude such that the FAR remained constant at 1%.

Figure 5:
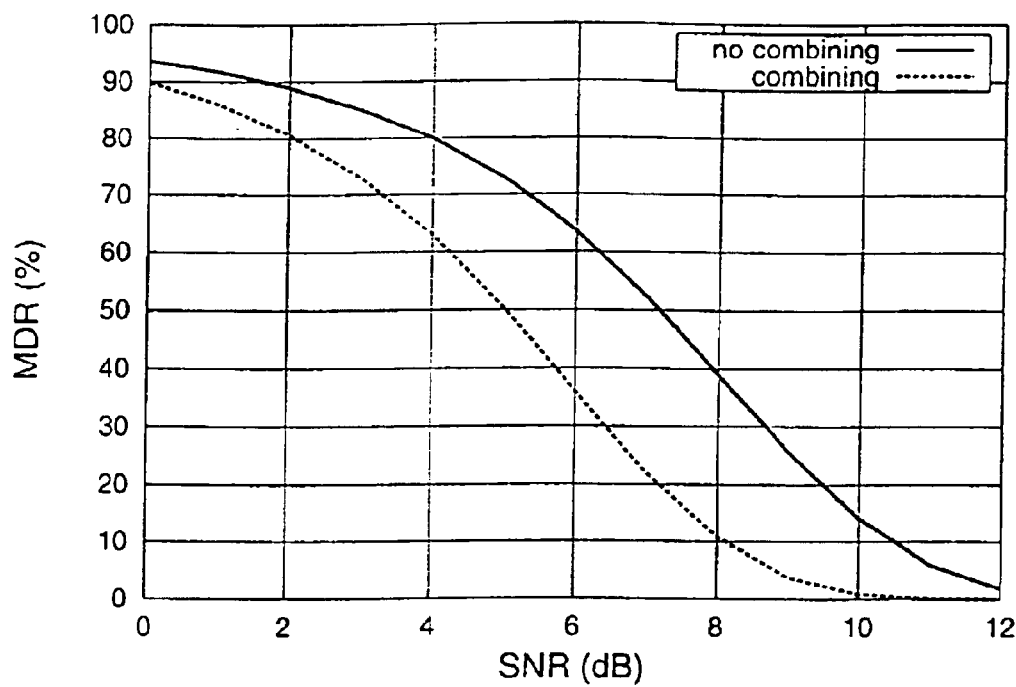
FIG. 5 is a graph of missed detection rate (MDR) in percent against signal to noise ratio (SNR) in dB for a fixed signal magnitude, the solid line indicating results with no combining at the BS and the dashed line indicating results with combining at the BS.

The results are shown in FIG. 5, which is a plot of the MDR in percent against the ratio of the signal magnitude to mean noise magnitude (SNR) in dB. The solid curve shows the results for the scheme without combining and the dashed curve the results with combining. The results of the combining scheme show a significant improvement in MDR, equivalent to an improvement of typically 2 dB in SNR.

Figure 6:
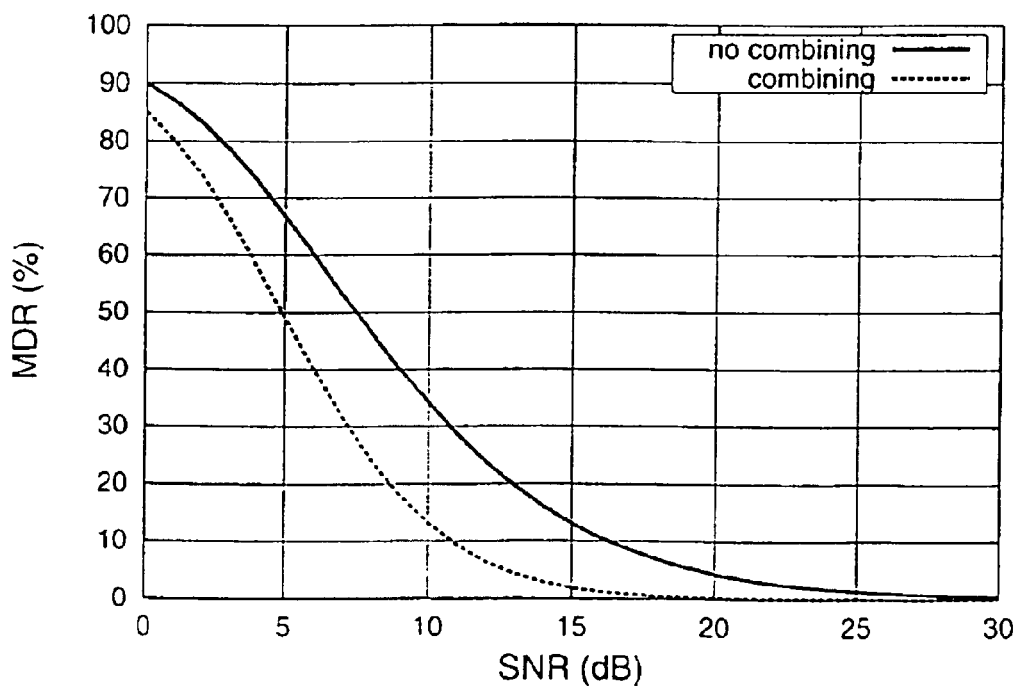
FIG. 6 is a graph of missed detection rate (MDR) in percent against signal to noise ratio (SNR) in dB for a signal subject to Rayleigh fading, the solid line indicating results with no combining at the BS and the dashed line indicating results with combining at the BS.

In a second simulation the level of the signal 404 was subjected to Rayleigh fading, to provide a more realistic mobile environment. The results are shown in FIG. 6, which is a plot of the MDR in percent against the SNR in dB. The solid curve shows the results for the scheme without combining and the dashed curve the results with combining. In both cases the results show significantly higher MDR for a given signal to noise ratio than the simulation without fading, as might be expected. Again the results of the combining scheme show a significant improvement in MDR, equivalent to an improvement of between 2 and 5 dB in SNR.

Alternative combining schemes could be used in a method in accordance with the present invention. The results discussed above demonstrate the improved accuracy resulting from combining two successive filter outputs. Further improvements could be obtained by combining more outputs, although at the cost of increased delay in the BS 100 responding to the requests from the MS 110.

A multiple threshold scheme could offer further advantages. Such a scheme would operate by examining the magnitude of the filter output. If it is above an upper threshold then a request has been detected which the BS 100 can acknowledge immediately, while if it is below a lower threshold no request has been detected. If the output lies between the two thresholds then signal combining schemes such as those described above can be used to resolve the question of whether a request was sent.

Some form of power control is also desirable. If a MS 110 transmits a request at too high a power level it may swamp other signals at the BS 100, while if it transmits at too low a power level the request will not be detected. Closed loop power control is not available until the requested services are set up. Open loop power control is possible if the MS 110 uses the characteristics of a broadcast channel from the BS 100 to determine the initial power at which to transmit its requests. If no acknowledgement is received from the BS 100 the power at which the requests are transmitted could be gradually increased, subject to appropriate maximum power limits.

In a Rayleigh fading environment there could also be advantages in having random or other variations in the transmitted power level.

A further application of a method in accordance with the present invention is in the provision of paging or other services, where a BS 100 transmits messages on a downlink channel 122 to a MS 110, and continues retransmitting until an acknowledgement is received from the MS 110. In this application therefore the BS 100 functions as a secondary station and the MS 110 as a primary station.

From reading the present disclosure, other modifications will be apparent to persons skilled in the art. Such modifications may involve other features which are already known in radio communication systems and component parts thereof, and which may be used instead of or in addition to features already described herein.

In the present specification and claims the word "a" or "an" preceding an element does not exclude the presence of a plurality of such elements. Further, the word "comprising" does not exclude the presence of other elements or steps than those listed.

What is claimed is:

1. A method of operating a radio communication system, comprising:
   allocating respective time slots in an uplink channel to a plurality of respective secondary stations; and
   transmitting a respective request for services to establish required services from at least one of the respective secondary stations to a primary station in the respective time slots;
   wherein the at least one respective secondary station re, transmits the same respective request in consecutive allocated time slots without waiting for an acknowledgement until said acknowledgement is received from the primary station,
   wherein the primary station determines whether a request has been transmitted by the at least one respective secondary station from a combination of the received signals in a plurality of successive time slots allocated to the at least one respective secondary station.

2. The method of claim 1, wherein the primary station determines whether said request has been transmitted only if the level of a received request is between lower and upper thresholds.

3. The method of claim 1, wherein the at least one respective secondary station modifies the power of the re-transmitted requests in response to a lack of acknowledgment from the primary station.

4. The method of claim 3, wherein the at least one respective secondary station increases the power of the re-transmitted requests in response to a lack of acknowledgment from the primary station.

5. The method of claim 1, wherein:
   the allocating of the respective time slots comprises allocating the respective time slots in frames in the uplink channel;
   each frame has a plurality of time slots; and
   the at least one respective secondary station re-transmits the respective request in the consecutive allocated time slots in a consecutive frames until the acknowledgement is received from the primary station.

6. The method of claim 1, wherein:
   when the at least one respective secondary station has received the acknowledgement from the primary station, the at least one respective secondary station stops any further requests for services from being transmitted, and begins negotiations with the primary station to define fully the requested services.

7. The method of claim 1, wherein:
   the requests for services comprise requests for establishing a new uplink channel for voice or data services.

8. A radio communication system, comprising:
   a primary station and a plurality of respective secondary stations;
   the primary station having means for allocating respective time slots in an uplink channel to a plurality of respective secondary stations to transmit respective requests for services to the primary station to establish required services;
   wherein the respective secondary stations have means for re-transmitting the same respective requests in consecutive allocated time slots without waiting for an acknowledgement until said acknowledgement is received from the primary station,
   wherein the primary station determines whether a request has been transmitted by at least one of the plurality of respective secondary stations from a combination of the received signals in a plurality of successive time slots allocated to the at least one of the plurality of respective secondary stations.

9. The radio communication system of claim 8, wherein:

the means for allocating allocates the respective time slots in frames in the uplink channel;

each frame has a plurality of time slots; and the means for re-transmitting re-transmit the respective requests in the consecutive allocated time slots in consecutive frames until the acknowledgement is received from the primary station.

10. The radio communication system of claim 8, wherein:

when at least one of the respective secondary stations has received the acknowledgement from the primary station, the at least one respective secondary station stops any further requests for services from being transmitted, and begins negotiations with the primary station to define fully the requested services.

11. The radio communication system of claim 8, wherein:

the requests for services comprise requests for establishing a new uplink channel for voice or data services.

12. A secondary station for use in a radio communication system, comprising:

means for transmitting a request for services to establish required services to a primary station in respective allocated time slots in an uplink channel;

wherein the primary station allocates respective time slots in the uplink channel to a plurality of respective secondary stations; and means for re-transmitting the same request for services in consecutive allocated time slots without waiting for an acknowledgement until said acknowledgment is received from the primary station, wherein the primary station determines whether a request has been transmitted by at least one of the plurality of respective secondary stations from a combination of the received signals in a plurality of successive time slots allocated to the at least one of the plurality of respective secondary stations.

13. The secondary station of claim 12, further comprising means for modifying the power of the re-transmitted requests in response to lack of acknowledgement from the primary station.

14. The secondary station of claim 12, wherein:

the primary station allocates the respective time slots in frames in the uplink channel;

each frame has a plurality of time slots; and the means for re-transmitting re-transmit the request in the consecutive allocated time slots in consecutive frames until the acknowledgement is received from the primary station.

15. The secondary station of claim 12, further comprising:

means for stopping any further requests for services from being transmitted when the acknowledgement is received from the primary station; and means for beginning negotiations with the primary station to define fully the requested services when the acknowledgement is received from the primary station.

16. The secondary station of claim 12, wherein:

the request for services comprises a request for establishing a new uplink channel for voice or data services.

17. A method of operating a radio communication system, comprising:

allocating respective time slots in an uplink channel to a plurality of respective secondary stations; and transmitting a respective request for services to establish required services from at least one of the plurality of respective secondary stations to a primary station in the respective time slots;

wherein the at least one of the plurality of respective secondary stations re-transmits the same respective request in consecutive allocated time slots without waiting for an acknowledgement until said acknowledgement is received from the primary station, wherein the primary station determines whether a request for services has been transmitted by the at least one of the plurality of respective secondary stations by determining whether a signal strength of the respective transmitted request of the at least one of the plurality of respective secondary stations exceeds a threshold value.

18. A radio communication system, comprising:

a primary station and a plurality of respective secondary stations;

the primary station having means for allocating respective time slots in an uplink channel to the plurality of respective secondary stations to transmit respective requests for services to the primary station to establish required services;

wherein the respective secondary stations have means for re-transmitting the same respective requests in consecutive allocated time slots without waiting for an acknowledgement until said acknowledgement is received from the primary station, wherein said primary station determines whether a request for services has been transmitted by at least one of the respective is secondary stations by determining whether a signal strength of the respective transmitted request of the at least one of the respective secondary stations exceeds a threshold value.

* * * * *